Aug. 14, 1951          R. F. OTT          2,564,499
                      LINE TIGHTENER
                   Filed Sept. 26, 1946
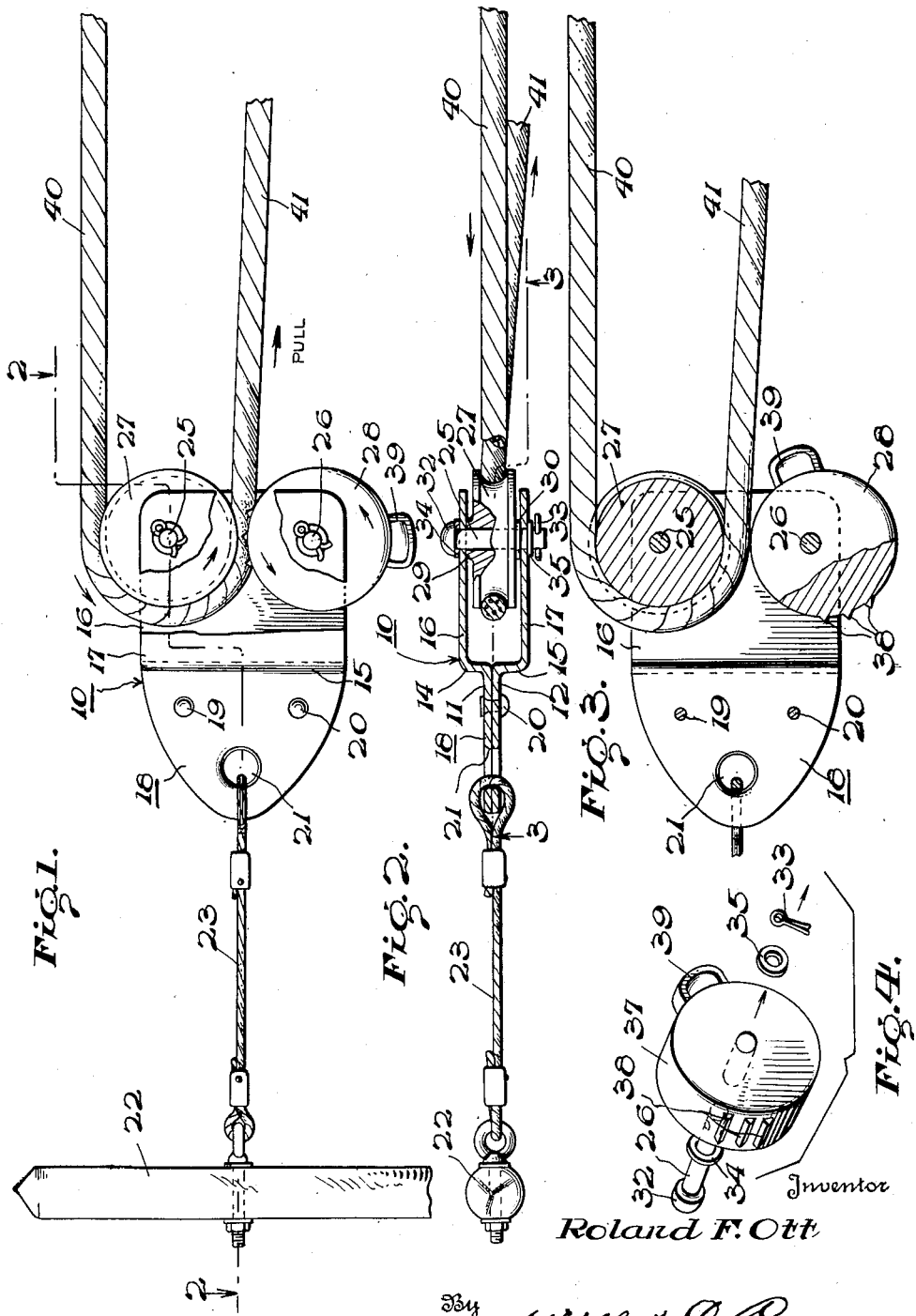
Inventor
Roland F. Ott
By Wilfred E. Lawson
Attorney Patented Aug. 14, 1951

2,564,499

UNITED STATES PATENT OFFICE 2,564,499

LINE TIGHTENER

Roland F. Ott, Alton, Ill.

Application September 26, 1946, Serial No. 699,479

1 Claim. (Cl. 188—65.1)

My present invention relates to line tighteners or the like.

It is an object of my invention to provide in a novel line tightener, a semi-automatic locking and self-releasing arrangement adapted to be actuated by pulling on the line to be tightened or released.

Another object is to provide a novel construction for the line tighteners or the like, whereby the several parts are easily and economically manufactured and assembled into a rugged unit.

A further object is to provide a more portable line tightener, which can be readily positioned for operation by attachment to any desired fixed point.

With these and other objects in view, the invention consists in the construction, arrangement and combination of parts hereinafter described and particularly pointed out in the claim, it being understood that I do not intend to limit myself to the details of construction.

In the drawings, like parts throughout the several views are given like numerals and are thus identified in the following detailed description.

Figure 1 is a side elevation of my invention applied to a line from a post, showing a part of the body member broken away to illustrate the relation of the parts in the body member.

Figure 2 is a longitudinal cross section view taken on line 2—2 of Figure 1.

Figure 3 is a partial vertical cross section of the device on line 3—3 of Figure 2.

Figure 4 is a perspective view of the eccentric line locking wheel with the axle pin and attachments therefor pulled apart.

Referring in detail to the drawing the device comprises a body member 10 formed from two similar plates 11 and 12. These plates are bent at an intermediate point, into shoulders 14 and 15, see Fig. 2, so as to provide spaced apart side walls 16 and 17, respectively. In the flat upper part 18, the plates fit together and are secured by rivets 19 and 20. This flat upper part 18 of the body member 10 is triangular in shape, and the apex of the part 18 is formed with an opening 21 for attaching the body member to any fixed point such as a post, hook or connection of some kind.

In Figure 1, the body member 10 is connected to a post 22 by a connection 23.

The novel line tightening mechanism is mounted and housed in the body member 10 between the walls 16 and 17, and comprises a pair of spaced substantially parallel axle pins 25 and 26, mounted through aligned openings in the body member walls, a pulley wheel 27 rotatably mounted on axle 25 and an eccentric line locking wheel 28 mounted on axle 26.

The pulley wheel 27 has integrally formed hub extensions 29 and 30, so as to provide bearing surfaces for contacting the side walls 16 and 17 around the openings therein to eliminate axial movement of the pulley wheel on the axle pin 25. Also, the axle pin 25 includes a head 32 and an opening for a cotter pin 33 in the opposite end, and if desired between the head 32 and the exterior of wall 16 and the cotter pin 33 and the exterior of wall 17 are washers 34 and 35, respectively.

The eccentric wheel 28 is similarly mounted on the axle pin 26, except that the center of the pin axis is eccentrically positioned to the rim 37 of the wheel 28. Also, instead of the wheel rim 37 of wheel 28 being grooved like the pulley wheel 27, it is flat except for a small sector thereof on which are projections or teeth 38, and opposite these projections is a lug 39. The axle pin 26 is the same as pin 25 and has the head 32, washers 34 and 35 and cotter pin 33 similarly mounted with respect to walls 16 and 17, see Fig. 4.

The lug 39 is closely adjacent to the low point of the wheel 28 and extends outwardly and substantially radially therefrom a distance substantially equal to the space between the low point of the wheel 28 and the periphery of the pulley 27 when the wheel 28 is idle. When the wheel 28 is idle, the weight of the high portion of the wheel 28, will maintain the lug 39 in such a raised position as to obstruct the passage or bight between the wheel 28 and the pulley 27. The lug 39 is at the side of its axle pin 26 remote from the attaching opening 21 of the body member 10 and said lug is of a size to contact the periphery of the pulley 27 to prevent the lug 39 passing upwardly and rearwardly beyond the bight between the pulley 27 and the wheel 28 to assure said lug being maintained at all times at the desired side of its axle pin 26. The lug 39 is also of a size to contact the shoulders 14 and 15 upon movement of the lug in the opposite direction to further assure the maintenance of the lug in proper location.

As the line 40 is looped around the pulley wheel 27, the threading between the wheels 27 and 28 of the line part 41 will result in such contact with the lug 39 as to initiately rotate the wheel 28 to bring the periphery of the wheel 28 closer to the line part 41 so that when pull is made upon the part 41 to tighten the line 40, there will be such frictional contact of the part 41 with the wheel 28 as to further rotate the wheel 28 to effect the desired clamping of the line between the wheels 27 and 28. It is also to be pointed out that the pull on the line part 41 generally will be on an angle downwardly from the substantially horizontal position illustrated in the drawing and that therefore there will be such contact of the line part 41 with the lug 39 as to effect positive rotation of the wheel 28 to assure the desired clamping of the line.

A similar pull on the line 40 will serve to release the teeth 38, by turning the eccentric on pin 26, and thus the line is released from the teeth and the clamping pressure between the two wheel rims.

From the foregoing many advantages and uses will be apparent, for example, the unit can be made with a single combination or it can be enlarged to support two or more pulleys and eccentrics within one bracket. Also, by making the same portable it can be adapted to various uses, such as line holders and stretchers, for rope tying of cargo and freight, and for wire tensioning.

While the features of the present invention are more or less specifically described, I wish it understood that various changes may be resorted to within the scope of the appended claim.

What I claim is:

In a line tightener, a body member comprising a pair of elongated substantially rectangular plates bent angularly at the approximate transverse centers thereof to provide oppositely directed flange portions, the flange portions at one end of the plates being secured in abutting relation and the flange portions at the other ends of the plates being spaced apart in parallel relation, a grooved pulley journalled in and between the last named flange portions above the longitudinal centers of the plates, a roller eccentrically journalled in and between the last named flange portions below said pulley, a lug projecting radially from the periphery of said roller and normally disposed in the path of the free end portion of a line trained over and about said pulley, and a series of teeth formed on the periphery of said roller at a point opposite from said lug which are adapted to bite into that portion of the line passed outwardly from between the pulley and the roller when a pull is exerted on the latter portion of the line to stretch the intermediate portion of the line taut, which pull causes the said latter portion of the line to engage with said lug and turn the roller to move the teeth into engagement therewith.

ROLAND F. OTT.

REFERENCES CITED

The following references are of record in the file of this patent:

UNITED STATES PATENTS

| Number | Name | Date |
| --- | --- | --- |
| 296,633 | Sells | Apr. 8, 1884 |
| 497,900 | Warner | May 23, 1893 |
| 567,032 | Lane | Sept. 1, 1896 |
| 632,530 | Lee et al. | Sept. 5, 1899 |
| 1,148,872 | Stillwell | Aug. 3, 1915 |
| 1,523,258 | Cedarquist | Jan. 13, 1925 |
| 2,226,937 | Masset | Dec. 31, 1940 |

FOREIGN PATENTS

| Number | Country | Date |
| --- | --- | --- |
| 331,681 | Italy | Nov. 13, 1935 |
| 767,229 | France | July 12, 1934 |